(12) United States Patent
Melchy et al.

(10) Patent No.: US 12,555,401 B2
(45) Date of Patent: Feb. 17, 2026

(54) AUTO-DOCUMENT DETECTION AND CAPTURE

(71) Applicant: Jumio Corporation, Palo Alto, CA (US)

(72) Inventors: Alix Melchy, Montreal (CA); Anshuman Vikram Singh, Vienna (AT); Lukas Danzer-Stauffer, Maria Anzbach (AT); Gernot Mueller, Modling (AT); Philipp Koller, Linz (AT); Paras Kapoor, Montreal (CA); Ormir Gjurgjej, Vienna (AT)

(73) Assignee: Jumio Corporation, Sunnyvale, CA (US)

( * ) Notice: Subject to any disclaimer, the term of this patent is extended or adjusted under 35 U.S.C. 154(b) by 538 days.

(21) Appl. No.: 17/709,034

(22) Filed: Mar. 30, 2022

(65) Prior Publication Data
US 2023/0316795 A1  Oct. 5, 2023

(51) Int. Cl.
*G06V 30/414* (2022.01)
*G06F 18/214* (2023.01)
*G06T 7/70* (2017.01)
*G06V 10/82* (2022.01)

(52) U.S. Cl.
CPC .......... *G06V 30/414* (2022.01); *G06F 18/214* (2023.01); *G06T 7/70* (2017.01); *G06V 10/82* (2022.01); *G06T 2207/20081* (2013.01); *G06T 2207/20084* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 9,191,642 B2 * | 11/2015 | Cudak | H04N 13/239 |
| 9,208,393 B2 * | 12/2015 | Kotovich | G06V 10/993 |
| 10,318,848 B2 * | 6/2019 | Dijkman | G06F 18/2113 |
| 10,331,966 B1 * | 6/2019 | Pribble | G06V 30/414 |
| 11,030,752 B1 | 6/2021 | Backlund et al. | |
| 11,144,752 B1 | 10/2021 | Castelblanco Cruz et al. | |
| 11,954,139 B2 * | 4/2024 | Paruchuri | G06N 3/08 |
| 2005/0175221 A1 | 8/2005 | Scott et al. | |

(Continued)

OTHER PUBLICATIONS

Ivan's Software Engineering Blog, "How to detect a hologram with OpenCV," 2018, retrieved from https://ai-facets.org/how-to-detect-a-hologram-with-opencv/ on Jul. 13, 2022, 10 pgs.

(Continued)

*Primary Examiner* — Chan S Park
*Assistant Examiner* — Promotto Tajrian Islam
(74) *Attorney, Agent, or Firm* — Patent Law Works LLP

(57) ABSTRACT

The disclosure includes a system and method for receiving, using one or more processors, first image data representing a first image of a document; obtaining, using the one or more processors, a first set of corner coordinates representing the corners of the document in the first image; generating, using the one or more processors, a first polygon based on the first set of corner coordinates; performing, using the one or more processors, one or more corner-based validity checks based on the first set of corner coordinates; and performing, using the one or more processors, an auto-capture.

20 Claims, 6 Drawing Sheets

(56) References Cited

U.S. PATENT DOCUMENTS

| | | |
|---|---|---|
| 2016/0309094 A1 | 10/2016 | Ishida |
| 2017/0169314 A1* | 6/2017 | Dijkman ............. G06F 18/2163 |
| 2019/0258886 A1* | 8/2019 | Rowley ................ G06V 30/224 |
| 2020/0394429 A1* | 12/2020 | Pribble ................ G06V 10/255 |
| 2021/0192260 A1* | 6/2021 | Pribble ................ G06V 30/414 |
| 2022/0005211 A1* | 1/2022 | Huang ...................... G06T 3/18 |
| 2022/0156300 A1* | 5/2022 | Paruchuri .............. G06V 10/82 |
| 2023/0036808 A1* | 2/2023 | Hall ........................ H04N 23/61 |
| 2023/0281821 A1* | 9/2023 | Pizzocchero ........ G06V 30/142 |
| | | 382/100 |

OTHER PUBLICATIONS

Pagaduan et al., "iBlurDetect: Image Blur Detection Techniques Assessment and Evaluation Study," in Proceedings of the International Conference on Culture Heritage, Education, Sustainable Tourism, and Innovation Technologies (CESIT 2020), Sep. 16-18, 2020, pp. 286-291.

Stack Overflow, "I have detected the glare spots in my photo with opencv-python. How can I remove them?" Aug. 6, 2020, retrieved from https://stackoverflow.com/questions/60859829/i-have-detected-the-glare-spots-in-my-photo-with-opencv-python-how-can-i-remove on Jul. 13, 2022, 4 pgs.

veriff.com, "Global Identity Verification Platform—Veriff," at least as early as Feb. 21, 2022, retrieved from https://www.veriff.com/product/idenity-verification on Jul. 13, 2022, 5 pgs.

PCT International Search Report and Written Opinion; Application No. PCT/US2023/064920 Jumio Corporation, International filing date of Mar. 24, 2023, date of mailing Jun. 28, 2023, 17 pages.

* cited by examiner

AUTO-DOCUMENT DETECTION AND CAPTURE

BACKGROUND

The present disclosure relates to image capture. More specifically, the present disclosure relates to capturing image data representing a document.

Documentation be provided for any number of reasons or in association with any number of transactions. For example, providing picture ID may be required to open a financial account to reduce the risk of fraud and/or to comply with laws (e.g., anti-money laundering or sanctions). In another example, a copy of recent bank statement or utility bill with a street address may be provided to prove a place of residence, which may be relevant for obtaining a library card, registering for school in a school district, registering to vote in a district, etc. In yet another example, an image of a check may be provided to deposit the check.

SUMMARY

This specification relates to methods and systems for automatically detecting and capturing a document. According to one aspect of the subject matter described in this disclosure, a computer-implemented method of automatically detecting and capturing a document includes receiving, using one or more processors, first image data representing a first image of a document; obtaining, using the one or more processors, a first set of corner coordinates representing the corners of the document in the first image; generating, using the one or more processors, a first polygon based on the first set of corner coordinates; performing, using the one or more processors, one or more corner-based validity checks based on the first set of corner coordinates; and performing, using the one or more processors, an auto-capture.

Other implementations of one or more of these aspects include corresponding systems, apparatus, and computer programs, configured to perform the actions of the methods, encoded on computer storage devices.

These and other implementations may each optionally include one or more of the following features. For instance, where obtaining the first set of corner coordinates includes applying a coordinate determination model to the first image data, the coordinate determination model performing a regression on the first image data. For instance, the retrained neural network is the coordinate determination model. For instance, the second set of training data may include a set of training images having a normalized format and a set of labels, the set of labels including a document type label describing a type of document in an associated image and a set of corner labels representing locations of corners of the document in the associated image. For instance, the one or more corner-based validity checks include at least one of whether the document is upright, whether the document is rotated, whether an edge length check is passed, whether the document is tilted, and an aspect ratio check. For instance, performing one or more usability checks, the one or more usability checks including at least one of a glare detection, a blur detection, an obstruction detection, a damage detection, and a color detection. For instance, at least a portion of the one or more usability checks is performed responsive to determining that no corner of the document is absent from the first image of document. For instance, the auto-capture is performed responsive to the counter satisfying the second threshold. For instance, the first image of the document and the second image of the document are non-consecutive images. For instance, the counter is reset when one or more of the inter-image corner distance value does not satisfy the first threshold or, prior to the counter satisfying the second threshold, a third image of the document is determined to be invalid based on a third polygon and one or more corner-based validity checks based on a third set of corner coordinates representing the corners of the document in the third image.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
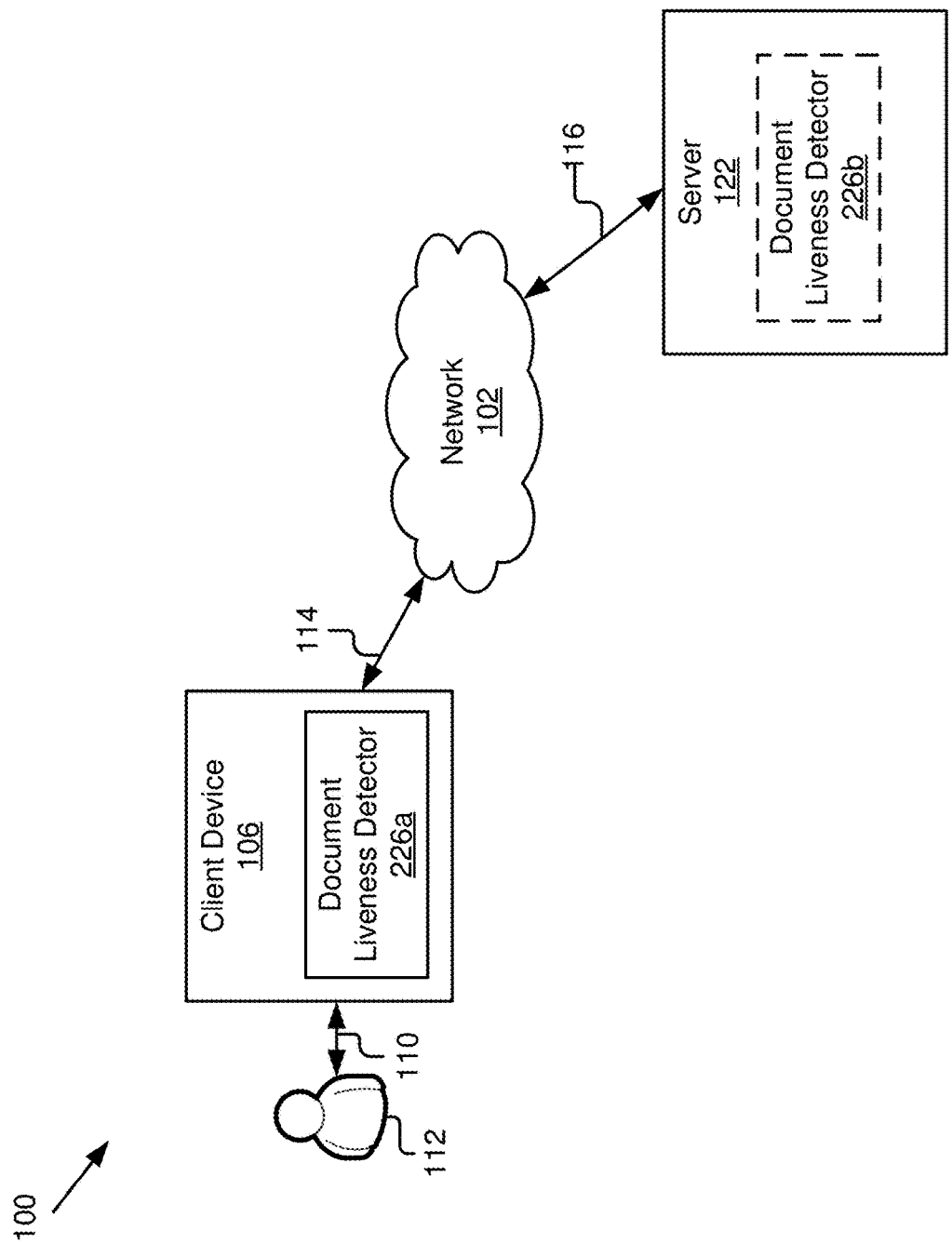
FIG. 1 is a block diagram of one example implementation of a system for automatically detecting and capturing a document in accordance with some implementations.

The present disclosure is described in the context of an example document detector and use cases; however, those skilled in the art should recognize that the document detector may be applied to other environments and use cases without departing from the disclosure herein.

Documentation be provided for any number of reasons or transactions. For example, providing picture ID may be required to open a financial account to reduce the risk of fraud and/or to comply with laws (e.g., anti-money laundering or sanctions). In another example, a copy of recent bank statement or utility bill with a street address may be provided to prove a place of residence, which may be relevant for obtaining a library card, registering for school in a school district, registering to vote in a district, etc. In yet another example, an image of a check may be provided to deposit the check.

Increasingly, transactions are being performed remotely or electronically, e.g., online through web browsers or mobile applications. Obtaining documentation remotely or electronically presents challenges, which are not present when a person physically presents the documentation in the physical world. When a person physically presents the documentation in the physical world, the document may be manipulated in order to find, view, and extract information from the document. In a remote or electronic transaction, direct physical manipulation and viewing of the physical document is not feasible. Rather, image data (e.g., a photo or video) of the document may be obtained, attributes (or data) extracted from the image, and compared to reference documentation.

A first challenge is obtaining image data that includes an image of a whole document, or at least the area(s) of interest within the document, and the whole document, or at least the area(s) of interest, are visible and/or readable. Multiple issues may plague image data representing documents and render the image data unsuitable. Examples of issues that may render the image data unsuitable may include, but are not limited to, an area of interest being out of frame, obstructed, damaged, or otherwise not visible; an area of interest being unreadable due to blur, glare, or damage, etc. Therefore, it may be beneficial to obtain image data that is suitable and free from such issues.

A second challenge is getting the user to provide image data that is suitable or free of issues, such as those described above. For example, a user may not know what area(s) are to be used, i.e., are of interest, to ensure that the area(s) are visible and/or readable. As another example, a user may not realize that there is glare when trying to hold still to take an image of a document. Expecting the user to learn areas of interest, when the user may be providing the documentation as part of an infrequently performed process or play detective to determine what issue(s) may have caused image data to be rejected may be unrealistic and lead to user frustration and dissatisfaction, as the user's image data may be repeatedly rejected without the user knowing why. Therefore, providing live feedback to indicate whether an issue is present and/or feedback on how to correct the detected issue may beneficially (1) conserve resources by reducing one or more of (a) a number of unsuccessful attempts/submissions of image data and (b) the amount of resources (e.g., processing, read-writes, electricity, etc.) used; (2) save time; (3) result in higher user satisfaction.

A third challenge is analyzing image data at scale and without human intervention. The number of remote or electronic transactions being performed is increasing, thus it may be desirable to automate analysis of an image of a document to determine suitability and extract data of interest from the document. However, automation and, more particularly, automation that is reliable and accurate is non-trivial. For example, as mentioned above, there are a number of different issues that may be encountered. As another example, there may be a variety of different types of acceptable documentation (e.g., driver's licenses from different states, passports from different countries, statements from different financial institutions or utilities, etc.) that may be encountered and accurately recognized and processed.

The document detector 226 described herein may address, at least in part, one or more of the foregoing issues and/or provide, at least in part, one or more of the aforementioned benefits.

FIG. 1 is a block diagram of an example system 100 for automatically detecting and capturing a document in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although only a single client device 106 is shown in the example of FIG. 1, there may be any number of client devices 106 depending on the implementation. The system 100 depicted in FIG. 1 is provided by way of example and the system 100 and further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit. The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the client device 106 may include an instance of the document detector 226a and the server 122 may optionally (as indicated by the dashed lines) include an instance of the document detector 226b. However, in some implementations, the components and functionality of the document detector 226 may be entirely client-side (i.e., at 226a), entirely server side (i.e., at 226b), or divide among the client device 106 and server 122 (i.e., divided across 226a and 226b). For example, as described below, some implementations may use machine learning (e.g., one or more models), and the training and validation of the model(s) may be performed server-side at 226a and applied, during production, client side at 226a.

Figure 2:
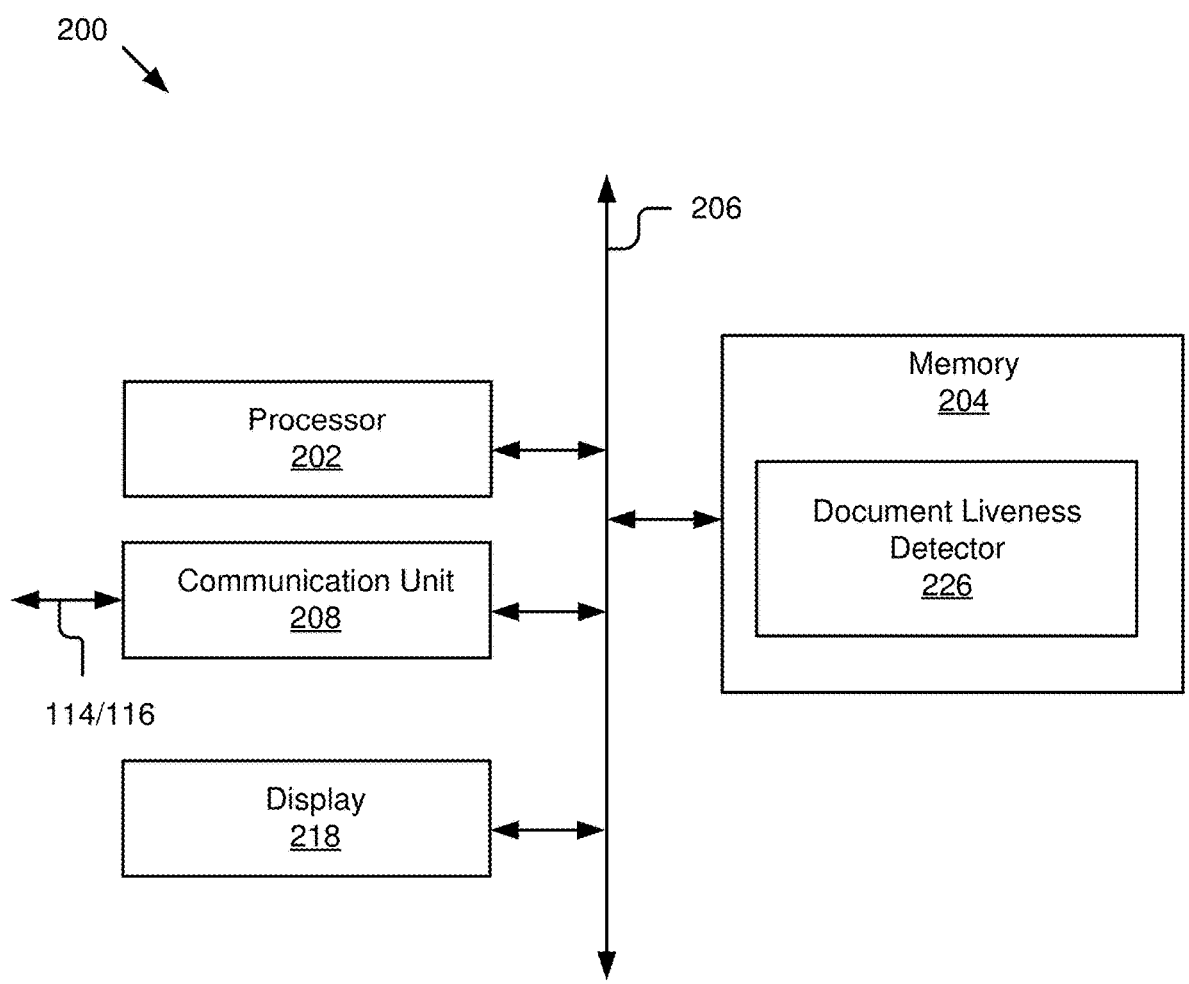
FIG. 2 is a block diagram of an example computing device in accordance with some implementations.

FIG. 2 is a block diagram of an example computing device 200 including an instance of the document detector 226. The document detector 226 which may refer to either instance 226a when the computing device 200 is a server 122, 226b where the computing device 200 is a client device 106, or a combination of 226a and 226b where the functionality is divided between 226a of the client device 106 and 226b of the server 122. In the illustrated example, the computing device 200 includes a processor 202, a memory 204, a communication unit 208, and a display 218. In some implementations, the computing device 200 is a client device 106, the memory 204 stores the document detector 226a, and the communication unit 208 is communicatively coupled to the network 102 via signal line 114. In some implementations, the computing device 200 is a client device 106, which may occasionally be referred to herein as a user device, and the client device 106 includes at least one sensor, e.g., a camera. In another implementation, the computing device 200 is a server 122, the memory 204 stores the document detector 226b, and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device 200. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the document detector 226. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. The memory 204 may be a single device or may include multiple types of devices and configurations.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display 218 is a conventional type such as a liquid crystal display (LCD), light emitting diode (LED), touchscreen, or any other similarly equipped display device, screen, or monitor. The display 218 represents any device equipped to display electronic images and data as described herein.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure. Examples of sensors (not shown) include, but are not limited to, a microphone, a speaker, a camera, a thermal camera, a pointer sensor (e.g., a capacitive touchscreen or mouse), a gyroscope, an accelerometer, a galvanic sensor, thermocouple, heart rate monitor, breathing monitor, electroencephalogram (EEG), iris scanner, fingerprint reader, raster scanner, palm print reader, an inertial sensor, global positioning system (GPS) sensor, etc.

In some implementations, the document detector 226 provides the features and functionalities described below responsive to a request. For example, a request on behalf of an entity (not shown) to determine whether a user-provided document (e.g., provided during a registration or customer onboarding) is live. As another example, a request by the user to capture a document (e.g., as part of a registration or customer onboarding).

Figure 3:
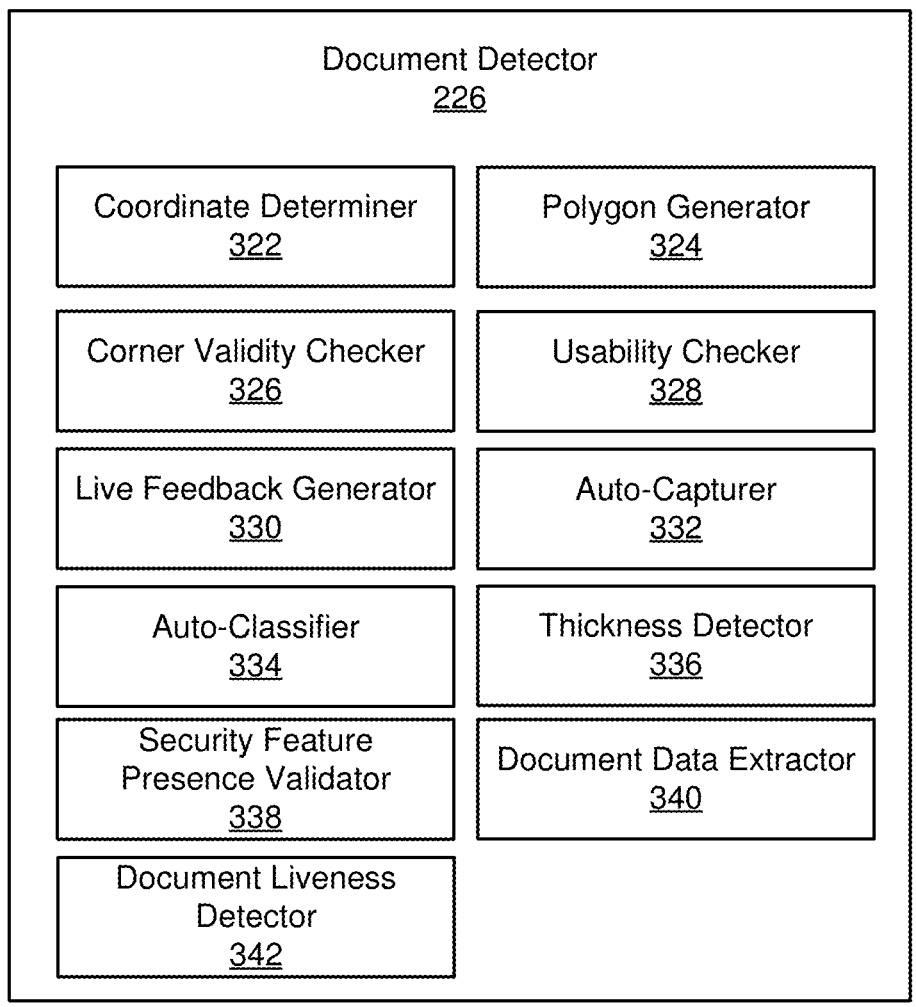
FIG. 3 is a block diagram of an example document detector in accordance with some implementations.

Referring now to FIG. 3, a block diagram of an example of document detector 226 is illustrated in accordance with one implementation. As illustrated in FIG. 3, the document detector 226 may include a coordinate determiner 322, a polygon generator 324, a corner validity checker 326, a usability checker 328, a live feedback generator 330, an auto-capturer 332, an auto-classifier 334, a thickness detector 336, a security feature presence validator 338, a document data extractor 340, and a document liveness detector 342.

The coordinate determiner 322 is communicatively coupled to one or more sensors and receives sensor data from one or more sensors. For example, in some implementations, the coordinate determiner 322 receives image data from a camera sensor. Examples of image data may include, but are not limited to, one or more of an image and a video.

The coordinate determiner 322 obtains a set of coordinates associated with a document from the image data. In some implementations, the set of coordinates associated with the document represent the locations of the corners of the document. From the set of coordinates, the document's location and orientation may be determined. For example, in some implementations, the coordinate determiner 322 determines four coordinates, or vectors, representing the four corners of a document (or less than four, e.g., when a corner is out of frame).

In some implementations, the coordinate determiner 322 obtains the set of coordinates associated with the document from the image data using machine learning. In some implementations, the coordinate determiner 322 trains a coordinate determination model using training data, validates the coordinate determination model, and applies the coordinate determination model to image data during production. In some implementations, the training and validation of the coordinate determining machine learning model may be performed server-side (e.g., within a coordinate determiner 322 instance of document detector 226*b*) and application of the coordinate determining machine learning model in production, after training and validation may be performed client-side (e.g., within a coordinate determiner 322 instance of document detector 226*a*).

In some implementations, the coordinate determiner 322 trains a coordinate determination machine learning model to perform a regression and, thereby, determine the coordinate set. The varieties of supervised, semi-supervised, and unsupervised machine learning algorithms that may be used, by the coordinate determiner 322, to train a coordinate determination machine learning model are so numerous as to defy a complete list. Example algorithms include, but are not limited to, a decision tree; a gradient boosted tree; boosted stumps; a random forest; a support vector machine; a neural network; a convolutional neural network; a recurrent neural network; long short-term memory; transformer; logistic regression (with regularization), linear regression (with regularization); stacking; a Markov model; Markov chain; support vector machines; and others. Additionally, the coordinate determination machine learning model, in some implementations, may be based on an ensemble of multiple machine learning algorithms, which may or may not be based on a common algorithm (e.g., neural network) or a common type of machine learning algorithm (e.g., supervised or regression). For clarity and convenience, the coordinate determiner 322 is described below with reference to coordinate determination machine learning models that perform regression.

In some implementations, the coordinate determiner 322 trains the coordinate determination model. The coordinate determination model may be trained by the coordinate determiner 322 using training data. The training data may vary based on the implementation and use case without departing from the description herein. In some implementations, the training data includes modified image data. The modifications applied to the image data may vary based on the implementation and use case. In some implementations, the training data may be generated by modification into a normalized format. For example, in some implementations, image data may be normalized by distorting the image into a 224×224×3 RGB image for training. In some implementations, image data captured (e.g., by a camera sensor), after training and validation, i.e., during production may be modified into the normalized format and used as an input to the coordinate determination model.

In some implementations, the training data includes labeled data. The labels may vary based on the implementation and use case. For example, in some implementations, the coordinate determiner 322 receives the training data including a set of labels associated with the images therein. For example, in some implementations, each modified image (e.g., normalized format image) in the training data is associated with a common set of labels. For example, the common set of labels, in some implementations, may include a document type (e.g., card or ID type) and labels identifying the corners (e.g., top-left, top-right, bottom-left, and bottom-right labels identifying a location of those respective corners in the image).

The document type may vary based on the implementation and use case. In some implementations, the document type may include a type associated with identification documentation. Examples of types associated with identification documentation include, but are not limited to a passport, driver's license, government issued photo identification card, school identification, employee identification, etc. In some implementations the document type label may include an issuer of the identification document type. Examples of issuers include, but are not limited to a country, state, province, municipality, jurisdiction, school, business, employer, or other entity. For example, a label associated with a US passport image may include a passport, documentation type label component, and a US, issuer label component. It should be recognized that, while the description herein frequently refers to documents that are identification documents, the description herein may apply to other documentation including, but not limited to, bank statements, utility bills, tax documents, etc.

The foregoing are merely examples and other labels exist and may be used in addition to, or instead of, the document type and corner labels, described above, without departing from this disclosure. For example, the common set of labels may include one or more of a label identifying a format and/or location of a machine readable zone within an image; a label identifying a side of a document (e.g., front or back); a label indicating no document in the training image or an invalid document in the training image; etc.

In some implementations, the coordinate determiner 322 initially trains a neural network on a large image database (not shown), which may include images other than images of documents of interest. Examples of images other than images of documents of interest may include images of non-documents. Examples of images of documents of interest may vary based on the implementation and use case, but may include, but are not limited to, identification documents, bills, statements, certificates, tax documents, etc.). For example, in some implementations, the coordinate determiner 322 pretrains a neural network on ImageNet. In some implementations, the coordinate determiner 322 may performs a retraining, or secondary training of the neural network to perform a regression. In some implementations, the secondary training may use labeled training data described above to generate the coordinate determination model. For example, the coordinate determiner 322 performs a secondary training using training data including images in a normalized format associated with corner labels and a document type label. In some implementations, the retrained (i.e., post-secondary training) neural network is the coordinate determination model.

In some implementations, the coordinate determiner 322 validates the coordinate determination model. For example, the coordinate determiner 322 divides the training data into a first portion used for the training and a second portion used for validation. The coordinate determiner 322 applies the model to the second, validation portion, of the training data and compares the coordinates output by the model to those labeled to determine accuracy of the model. In some implementations, after the coordinate determination model is validated to ensure accuracy, the coordinate determiner 322 puts the coordinate determination model into production to determine a set of coordinates from incoming (e.g., newly received, unlabeled, image data).

In some implementations, during production, the coordinate determiner 322 receives image data, modifies the image data, applies the coordinate determination model, and generates a set of coordinates. For example, in some implementations, image data, which may be taken by a camera sensor of the client device 106 and included in a validation request to the document detector 226, is received by the coordinate determiner 322; the coordinate determiner 322 modifies the image into the normalized format, applies the coordinate determination model, and outputs the set of coordinates.

Figure 4:
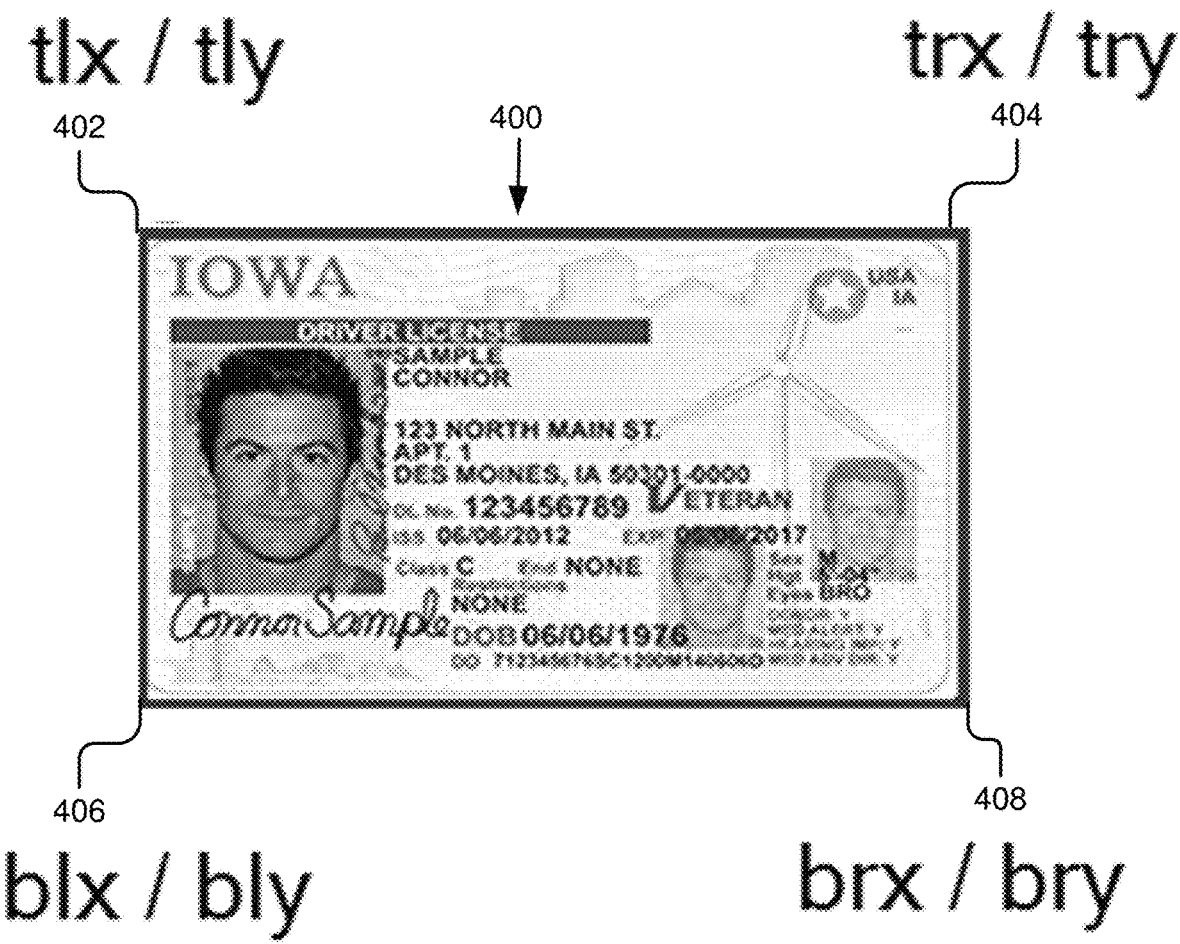
FIG. 4 is an illustration of an example document and corner coordinates in accordance with some implementations.

The set of coordinates output by the coordinate determiner 322 may vary based on the implementation and use case. In some implementations, the set of coordinates is a set of coordinates representing the location of the corners of a document represented in the image data. For example, referring now to FIG. 4, an image of an example document 400 is illustrated according to some implementations. The illustrated document 400 is an Iowa state driver's license issued to an individual named "Connor Sample." In one implementation, the set of coordinates includes the four coordinates of the corners as indicated at 402 (top-left corner), 404 (top-right corner), 406 (bottom left corner), and 408 (bottom-right corner). In some implementations each coordinate in the set of coordinates may include a horizontal (or x) component and a vertical (or y) component.

In some implementations, the set of coordinates is a set of one or more vectors of corner coordinates. For example, in one implementation, the coordinate determiner 322 outputs the vector of corner coordinates: tlx, tly, trx, try, blx, bly, brx, bry, where "t" represents top, "b" represents bottom, "l" represents left, "r" represents right, "x" represents the x-coordinate, and "y" represents the y-coordinate. Therefore, foregoing example outputs vector may be read as the x-coordinate of the top-left corner, the y-coordinate of top-left corner, the x-coordinate of the top-right corner, the y-coordinate of the top-right coordinate, the x-coordinate of the bottom-left coordinate, and so on. However, this is merely an example, and the order of corners in the vector may vary without departing from the scope of this disclosure.

In some implementations, the coordinate determiner 322 determines a set of coordinates include one or more coordinates that are out of frame. For example, in some implementations, the coordinate determiner 322 may include an extrapolated coordinate representing an expected location of a corner outside the frame of the image, e.g., when an image is taken where a corner of the document is not in frame.

In some implementations, the coordinate determiner 322 communicates the set of coordinates to, or stores the set of coordinates for retrieval by, one or more components of the document detector 226, e.g., the polygon generator 324 and/or the corner validity checker 326. For example, in some implementations, the polygon generator 324 may obtain the set of coordinates and generate a polygon. In another example, in some implementations, the corner validity checker 326 may obtain the set of coordinates and perform one or more corner-based validity checks.

The polygon generator 324 generates a polygon. In some implementations, the polygon generator 324 generates a polygon based on the received set of coordinates. In some implementations, the polygon generated by the polygon generator 324 represents a determined outline of the document, or a portion of the document visible, e.g., within the frame of the client device's camera sensor.

In some implementations, the polygon generator 324 determines whether a corner is absent. In some implementations, the polygon generator 324 determines a corner is absent when the corner is out of frame. For example, in some implementations, the polygon generator 324 obtains a set of corner coordinates generated by the coordinate determiner 322, creates a polygon from the coordinates, and determines whether a polygon point is outside of the current camera frame. For example, the polygon generator 324 may determine whether a point on generated polygon has an x-coordinate value, or y-coordinate value, that is less than zero and/or an x-coordinate value, or y-coordinate value, that is greater than width, or height respectively, of the camera frame, and, if true, treats the image, or frame, as invalid.

In some implementations, the polygon generator 324 is communicatively coupled to the live feedback generator 330. For example, the polygon generator 324 sends to, or stores for retrieval by, the live feedback generator 330 an indication of invalidity based on corner absence to the live feedback generator 330. In some implementations, the image, or frame, which is invalid for missing a corner may not undergo further analysis as described below (e.g., corner-based validity checks or usability checks may not be performed if a corner is absent/out-of-frame).

In some implementations, the polygon generator 324 is communicatively coupled to the corner validity checker 326. For example, the polygon generator 324 sends to, or stores for retrieval by, the corner validity checker 326 an indication of validity based on corner presence to the corner validity checker 326, which may perform one or more corner-based validity checks.

The corner validity checker 326 performs one or more corner-based validity checks based on the set of coordinates. Examples of corner-based validity check may include, but are not limited to, whether the document is upright, whether the document is rotated, whether the document is tilted, whether the document is tilted, and whether the document edge lengths satisfy a threshold. One or more of the number of corner-based validity checks performed, which corner-based validity checks are performed, an order of corner-based validity checks performed, and a circumstance under which a particular corner-based validity check is performed may vary based on the implementation and use case.

Depending on the implementation, the order of the corner-based validity checks may vary based on one or more criteria. Examples of criteria may include, but are not limited to, a relative computational load for performing a particular corner-based validity check (e.g., performing the least-resource-intensive validity check(s) first), and likelihood of detecting a corner-based invalidity (e.g., performing the validity checks based on statistics of historic invalidities indicating that documents are more likely to not be upright than tilted, thus performing an upright validation prior to a tilt validation). In some implementations, the one or more criteria may be weighted, e.g., to strike a balance between likelihood of a particular type of invalidity and the computational load associated with checking for that particular type of invalidity. In one implementation, the corner validity checker 326 performs the following corner-based validity checks in order: determine whether the document is upright, determine whether the document is rotated, determine whether the document is tilted, determine whether the document is tilted, and determine whether the document edge lengths satisfy a threshold.

In some implementations, the corner validity checker 326 determines whether the document is upright. In some implementations, the corner validity checker 326 determines whether the document is upright by determining whether top-left corner and top-right corner y-coordinates are smaller than the bottom-left corner and bottom-right corner y-coordinates.

In some implementations, the corner validity checker 326 determines whether the document is rotated. In some implementations, the corner validity checker 326 determines whether the document is rotated by applying the law of sines (arctan) and the corner coordinates to calculate an amount of rotation and determine whether that amount of rotation satisfies (e.g., exceeds) a threshold angle of rotation and in which direction (e.g., clockwise, or counterclockwise).

In some implementations, the corner validity checker 326 checks one or more pairs of edge lengths. For example, in some implementations, the corner validity checker 326 compares the top and bottom edges to each other and/or the left and right edges to each other and determines whether the edge lengths in a pair (e.g., top/bottom or left/right) are satisfy a threshold (e.g., the difference in edge length between edges in a pair does not exceed 10% of the sum of the two edge lengths).

In some implementations, the corner validity checker 326 checks for tilt. For example, in some implementations, the corner validity checker 326 calculates inner angles of the polygon (e.g., generated by the polygon generator 324) and determines whether those inner angles are within a threshold range of 90°. In another example, in some implementations, the thickness detector 336, which is discussed below, determines a documents thickness, and the corner validity checker 326 may calculate the inner angle to determine that there is sufficient tilt (e.g., a second threshold is satisfied) that the edge of the document should be visible and useable by the thickness detector 336.

In some implementations, the corner validity checker 326 checks for a valid document aspect ratio. For example, in some implementations, the corner validity checker 326 calculates a ratio of the left edge to the top (or bottom) edge and/or the right edge to the top (or bottom) edge, to determine whether the one or more ratios are within a predefined range. For example, the exact card ratio for an ID1 card according to the ISO/IEC spec is 0.63. In some implementations, the corner validity checker 326 may determine whether the ratio(s) are between 0.58 and 0.66. In some implementations, the corner validity checker may determine the predefined range based on a classification of the document. For example, in some implementations, the auto-classifier 334 (described below) may classify the document in the image as an ID1 card, and the corner validity checker 326 receives that classification, and applies the 0.58 to 0.66 aspect ratio range.

In some implementations, the corner validity checker 326 may perform a complete set corner-based validity checks in parallel or in series. In some implementations, when the corner validity checker 326 performs corner-based validity check in series, and when a corner-based validity check fails, the image, or frame, is determined to be invalid, and subsequent corner-based validity checks in the series are not performed on the frame. In some implementations, the image, or frame, which is invalid for failing a corner-based validity check may not undergo further analysis as described below (e.g., usability checks may not be performed when a corner-based validity check fails).

In some implementations, the corner validity checker 326 is communicatively coupled to the live feedback generator 330. For example, the corner validity checker 326 sends to, or stores for retrieval by, the live feedback generator 330 an indication of corner-based invalidity to the live feedback generator 330. The indication of corner-based invalidity may include an identification of the corner-based validity check failed (e.g., a document rotation check failed) and, depending on the implementation, additional information describing the error or invalidity (e.g., document rotated clockwise beyond threshold).

In some implementations, the corner validity checker 326 is communicatively coupled to the usability checker 328. For example, the corner validity checker 326 sends to, or stores for retrieval by, the usability checker 328 an indication of corner-based validity to the usability checker 328 and the usability checker performs one or more usability checks.

The usability checker 328 performs one or more usability checks. Examples of usability checks may include one or more of glare detection, blur detection, obstruction detection, damage detection, and color (or black and white) detection. However, it should be understood that these are merely examples and other usability checks exist and may be used without departing from the scope of this disclosure.

In some implementations, the usability checker 328 performs a glare check, or glare detection. In some implementations, the usability checker 328 determines the glare check fails when glare is detected. In some implementations, the usability checker 328 determines the glare check fails when glare is detected in an area of interest. For example, the usability checker 328 determines that glare is present on an area of interest, which may make the area of interest unusable, e.g., no longer machine-readable or human-readable. Examples of areas of interest may include, but are not limited to fields (e.g., associated with a name, address, identification number, account number, class, age, sex, height, weight, eye color, hair color, document issuer, expiration date, etc.), a security feature (e.g., a seal, hologram, watermark, signature, etc.), a picture (e.g., of a face in a photo ID), a machine readable zone (e.g., a barcode or QR code), etc.

In some implementations, the usability checker 328 performs a blur check, or blur detection. In some implementations, the usability checker 328 determines the blur check fails when blur is detected indicating the document, or a portion thereof, is out of focus. In some implementations, the usability checker 328 determines the blur check fails when blur is detected in an area of interest. For example, the usability checker 328 determines that an area of interest is blurry, which may make the area of interest unusable, e.g., no longer machine-readable or human-readable.

In some implementations, the usability checker 328 performs an obstruction check, or obstruction detection. In some implementations, the usability checker 328 determines the obstruction check fails when an obstruction is detected indicating the document, or a portion thereof, is not visible or hidden. In some implementations, the usability checker 328 determines the obstruction check fails when an obstruction is detected in an area of interest. For example, the usability checker 328 determines that an area of interest is obstructed (e.g., by a user's finger holding the ID or not visible because the document is folded), which may make the area of interest unusable, e.g., no longer machine-readable or human-readable.

In some implementations, the usability checker 328 performs a damage check, or damage detection. In some implementations, the usability checker 328 determines the damage check fails when damage is detected indicating the document, or a portion thereof, is damaged (e.g., torn, delaminated, scratched, etc.). In some implementations, the usability checker 328 determines the damage check fails when damage is detected in an area of interest (e.g., a portion of the lamination over the image is damaged and not just a bit of damage to a corner, which may indicate tampering).

In some implementations, the usability checker 328 performs a color check, or color detection. In some implementations, the usability checker 328 determines the color check fails when color is expected but not detected, which may indicate a black and white copy of the document.

The usability checks, such as the examples provided above, may be executed in series or in parallel. In some implementations, one or more of the usability checks applies a model trained by machine learning. For example, in some implementations, the usability checker 328 trains, validates, and applies a glare detection model, a blur detection model, etc. In some implementations, the one or more usability checking models is trained using training data including images in the normalized format described above.

The varieties of supervised, semi-supervised, and unsupervised machine learning algorithms that may be used (e.g., trained and applied), by the usability checker 328, are so numerous as to defy a complete list. Example algorithms include, but are not limited to, a decision tree; a gradient boosted tree; boosted stumps; a random forest; a support vector machine; a neural network; a convolutional neural network; a recurrent neural network; long short-term memory; transformer; logistic regression (with regularization), linear regression (with regularization); stacking; a Markov model; Markov chain; support vector machines; and others. Additionally, the model(s) for performing the one or more usability checks, in some implementations, may be a model based on an ensemble of multiple machine learning algorithms, which may or may not be based on a common algorithm (e.g., neural network) or a common type of machine learning algorithm (e.g., supervised). In some implementations, each usability check may be associated with its own model or set of models.

Depending on the implementation, the usability check(s) may be performed, by the usability checker 328, prior to auto-capture, after auto-capture, or a first portion of the usability checks may be performed prior to auto-capture and a second portion of the usability checks may be performed after the auto-capture. In some implementations, at least a portion of the usability checks are performed prior to auto-capture, by the auto-capturer 332, so that any usability issues (i.e., failed usability checks) may be detected and corrected (e.g., by prompting the user via the live feedback generator 330) prior to auto-capture.

In some implementations, the usability checker 328 is communicatively coupled to the live feedback generator 330. For example, the usability checker 328 sends to, or stores for retrieval by, the live feedback generator 330 an indication of a usability check failure (and/or pass depending on the implementation) to the live feedback generator 330. The indication of a usability check failure may include an identification of the usability check that failed (e.g., an obstruction check) and, depending on the implementation, additional information describing the error or failure (e.g., name field not visible or obstructed).

In some implementations, the usability checker 328 is communicatively coupled to the auto-capturer 332. For example, the usability checker 328 sends to, or stores for retrieval by, the auto-capturer 332 an indication of indication of a usability check failure (and/or pass depending on the implementation) to the auto-capturer 332.

The live feedback generator 330 generates and presents live feedback to a user. In some implementations, the live feedback generator 330 generates and presents live feedback to responsive to an issue. Examples of issues may include, but are not limited to, an invalidity (e.g., one or more of the corner-based invalidities discussed above with reference to the corner validity checker 326), a non-usability (e.g., based on a failure of one or more of the usability checks discussed above with reference to the usability checker 328).

In some implementations, the live feedback generator 330 generates and presents live feedback to the user that includes one or more of an identification of the issue and a corrective action based on the issue. The corrective action may be based on the issue. For example, when the issue includes a failure of a rotation check by the corner validity checker 326, the live feedback generator 330 may present feedback to the user identifying the issue (e.g., "The document is rotated.") and providing corrective action (e.g., "Rotate your device clockwise."). In another example, when the issue includes a failure of a usability check by the usability checker 328, the live feedback generator 330 may present feedback to the user identifying the issue (e.g., "The image is blurry.") and providing corrective action (e.g., "Please hold still.").

The live feedback generator 330 may be communicatively coupled to one or more of the components, such as 322, 324, 326, 328, 332, 334, 336, 338, 340, and 342, of the document detector 226. For example, the live feedback generator 330 may be communicatively coupled to the polygon generator 324 to receive an indication of invalidity based on corner absence in some implementations. In some implementations, the live feedback generator 330 may generate feedback indicating that the whole document is not in frame and to reposition the camera/device so that the whole document is within frame.

As another example, the live feedback generator 330 may be communicatively coupled to the corner validity checker 326 to receive an indication of corner-based invalidity, which may include an identification of the corner-based validity check failed (e.g., a document rotation check failed) and, depending on the implementation, additional information describing the error or invalidity (e.g., document rotated clockwise beyond threshold). In some implementations, the live feedback generator 330 may generate feedback indicating the issue (i.e., document is rotated in the current example) and instructing the user to take corrective action (i.e., rotate camera counterclockwise in the current example).

In yet another example, the live feedback generator 330 may be communicatively coupled to the corner validity checker 326 to receive an indication of corner-based invalidity, which may include an identification of the corner-based validity check failed (e.g., a document rotation check failed) and, depending on the implementation, additional information describing the error or invalidity (e.g., document rotated clockwise beyond threshold). In some implementations, the live feedback generator 330 may generate feedback indicating the issue (i.e., document is rotated in the current example) and instructing the user to take corrective action (i.e., rotate camera counterclockwise in the current example).

As still another example, the live feedback generator 330 may be communicatively coupled to the auto-classifier 334 to receive a classification of the document represented in the image data. In some implementations, the live feedback generator 330 generates feedback based at least in part on the class of document determined by the auto-classifier 334. For example, when the class of document is associated with a hologram or color changing ink. The live feedback generator 330 may prompt the user to slowly move the camera to vary the viewing angle of the document, so that the security feature presence validator 338 may determine whether the hologram or color changing ink is present. As another example, some documents (e.g., IDs) may have a certain thickness, and in some implementations, the live feedback generator 330 may prompt the user to tilt the camera more so that a tilt check is satisfied and the thickness of the document may be visible and evaluated by the thickness detector.

Depending on the implementation and use case, the live feedback generator 330 may generate and provide live feedback that is visual and/or aural. Examples of visual feedback may include, but are not limited to, text and graphical elements. For example, text instructing the user to "Hold still." As another example, a graphical element, such as a rectangle in which the user is to frame the document or a bounding box outline the detected document may be presented. In some implementations, such a graphical element may be visually modified to provide feedback, e.g., the rectangle or bounding box may have used dashed lines when an invalidity is present or a usability check has failed and a solid line when valid and free of detected usability issues.

Examples of aural feedback may include but are not limited to audio prompts, such as "Hold still" presented through a speaker of the client device 106. In some implementations, an aural prompt may use a text-to-talk, to take the text generated in the above visual example, and generate the "Hold still" audio feedback. In some implementations, whether the prompt includes visual, aural, or both types of feedback may be based on an accessibility option (e.g., based on a user selected accessibility option for visually impaired on a user's mobile phone).

The auto-capturer 332 auto-captures image data. In some implementations, the auto-capturer 332, based on an output, or depending on the implementation a lack of output, from one or more of the polygon generator 324, the corner validity checker 326, and the usability checker 328, that a single image, or frame from a video input, is issue free and, therefore, valid, and based on the validity determines whether to auto-capture that image or video frame.

In some implementations, the auto-capturer 332 determines an inter-image corner distance value representing movement of the corners between images and determines whether the inter-image corner distance value satisfies a threshold. For example, in some implementations, the auto-capturer 332 determines, between valid frames, an average distance of corner movement (i.e., an average of how much the top-left, top-right, bottom-left, and bottom-right corners moved between consecutive valid frames) as the inter-image corner distance value, and the auto-capturer 332 determines whether that inter-image corner distance value is below a threshold. In some implementations, when the auto-capturer 332 determines whether that inter-image corner distance value is below the threshold, the auto-capturer 332 increments a counter representing a number of valid results. Determining that the inter-image corner distance value between valid frames satisfies a threshold may beneficially ensure the user holds the document still and is not moving too quickly.

In some implementations, the auto-capturer 332 determines the inter-image corner distance value between valid frames that are consecutive, i.e., one valid frame immediately followed by another valid frame. In some implementations, the auto-capturer 332 determines the inter-image corner distance value between valid frames that are sequential but may or may not be consecutive. Implementations in which the inter-image corner distance value is determined between sequential, but not necessarily consecutive, valid frames may mitigate intermediate invalid results determined by the models and may mitigate invalid results due to the user jittering. In some implementations, the sequential valid frames may be subject to an intermediary frame limit. For example, when a limit is one invalid intermediary frame between a first valid frame and a second valid frame, an invalid intermediary frame may be dropped, and the inter-image corner distance between the first and second valid frames determined by the auto-capturer, but when two or more invalid intermediary frames are present, the auto-capturer 332 does not evaluate the inter-image corner distance, and does not auto-capture the first and second valid frames. For example, the auto-capturer 332 resets a valid frame counter. It should be recognized that the foregoing one invalid intermediary frame limit example is provided for clarity and convenience, and that the limit may vary based on the embodiment. For example, the limit may be 1, 2, 3, 4, 5, etc. invalid intermediary frames.

The "valid" frames, images, or results may vary based on the implementation and use case. For example, in some implementations, no usability checks are performed by the usability checker 328 prior to capture by the auto-capturer 332. In some of those implementations, a valid result may be valid in that no corners are absent, as determined by the polygon generator 324, and one or more corner-based validity checks pass, as determined by the corner validity checker 326. As another example, in some implementations, the usability checker 328 may perform one or more usability checks prior to capture by the auto-capturer 332. In some of those implementations, a valid result may be valid in that no corners are absent, as determined by the polygon generator 324, the one or more corner-based validity checks passed, as determined by the corner validity checker 326, and the one or more pre-capture usability checks passed, as determined by the usability checker 328.

In some implementations, when the auto-capturer 332 determines a first, predefined number of consecutive, valid results are present, the live feedback generator 330 may generate and provide live feedback. For example, in some implementations, when two consecutive valid frames are detected, a rectangle presented on the display of the client device is displayed with solid lines along with the textual feedback "Hold still."

In some implementations, when the auto-capturer 332 determines a second, predefined number of consecutive, valid results are present, captures the image data. In some implementations, the captured image data may include at least a portion of the consecutive images associated with the valid results. For example, when the second predefined threshold is 15 consecutive valid frames, in some implementations, the auto-capturer 332 buffers 15 or more consecutive frames and responsive to determining that 15 consecutive frames are valid, automatically captures and stores the 15 valid frames or a portion thereof. In some implementations, the second predefined threshold is dynamic. For example, the second predefined threshold may be dynamic based on one or more of a frame rate, a client device 106 or device type, device operating system, document type, model confidence, or another criterion.

In some implementations, when an invalid result is detected while acquiring enough consecutive valid frames to satisfy the second threshold, or when the inter-image corner distance value is too large, which may indicate fast movement, the consecutive frame counter may be reset to 0.

Depending on the implementation, the auto-captured image data may include one or more of the image data in the normalized (e.g., distorted) format and the raw image data from which the normalized image data was generated.

The auto-capturer 332 is communicatively coupled to one or more of the components of the document detector 226 to provide auto-captured image data. For example, in some implementations, the auto-capturer 332 is communicatively coupled to the auto-classifier 334, which performs a classification. In another example, the auto-capturer 332 is communicatively coupled to the thickness detector 336, which performs a thickness detector. In another example, the auto-capturer 332 is communicatively coupled to the security feature presence validator 338, which performs a security feature presence validation. In another example, the auto-capturer 332 is communicatively coupled to the document data extractor 340, which performs document data extraction. In another example, the auto-capturer 332 is communicatively couple to the document liveness detector 342, which performs a document liveness detection.

The auto-classifier 334 determines a class associated with the document represented in the image data. Examples of classification that may be output by the auto-classifier 334 may vary in granularity depending on the implementation, and may include one or more of a document super class (e.g., passport, driver's license, statement, etc.), a document class (e.g., associated with the document issuer such as a state or country), and a document sub-class (e.g., minor, commercial driver's license, or vertically/horizontally oriented identification card).

While the auto-classifier 334 is described as a classifier, which is typically associated with supervised machine learning. Depending on the implementation, the auto-classifier 334 may use supervised, semi-supervised, and unsupervised machine learning algorithms. The varieties of supervised, semi-supervised, and unsupervised machine learning algorithms that may be used, by the auto-classifier 334, to classify a document are so numerous as to defy a complete list. Example algorithms include, but are not limited to, a decision tree; a gradient boosted tree; boosted stumps; a random forest; a support vector machine; a neural network; a convolutional neural network; a recurrent neural network; long short-term memory; transformer; stacking; a Markov model; Markov chain; and others. Additionally, the classifier may be based on an ensemble of multiple machine learning algorithms, which may or may not be based on a common algorithm (e.g., support vector machines) or a common type of machine learning algorithm (e.g., supervised or tree-based). In some implementations, the labeled training data in the normalized format includes a document class label and is used to train and validate the auto-classifier 334.

The thickness detector 336 determines a thickness of the document and determines whether the determined thickness is consistent with the document. For example, the thickness detector interacts with the live feedback generator 330 to prompt the user to manipulate the document to make the edge(s) visible to the camera (i.e., present in the image data). Depending on the implementation, the thickness detector 336 may use a 360 degree rotation of the document (e.g., rotating the document from front-to-back and continuing the rotation until the front of the document is facing the camera again) or a 180 degree rotation (e.g., rotating the document from front-to-back) and obtains multiple frames during that rotation. Depending on the implementation, the thickness detector 336 may use different or a different number of edges to determine the thickness. For example, in some implementations, the thickness detector 336 determines a thickness of the document and determines whether the determined thickness is consistent with the document based on a single edge. As another example, in some implementations, the thickness detector 336 determines a thickness of the document and determines whether the determined thickness is consistent with the document based on multiple edges (e.g., adjacent edges, opposite edges, or four edges).

In some implementations, the thickness detector 336 calculates an edge thickness (e.g., of a plastic ID card) and determines whether the thickness is consistent (e.g., with the class of ID determined by the auto-classifier). Depending on the implementation, the thickness determination may be performed pre, or post, auto-capture.

In some implementations, the thickness detector 336 uses machine learning to one or more of identify an edge, determine the edge thickness, and determine whether the determined edge thickness is within a range of expected thickness for the document. The varieties of supervised, semi-supervised, and unsupervised machine learning algorithms that may be used by the thickness detector 336 are so numerous as to defy a complete list. Example algorithms include, but are not limited to, a decision tree; a gradient boosted tree; boosted stumps; a random forest; a support vector machine; a neural network; a convolutional neural network; a recurrent neural network; long short-term memory; transformer; logistic regression (with regularization), linear regression (with regularization); stacking; a Markov model; Markov chain; support vector machines; and others. Additionally, the thickness detection machine learning model, in some implementations, may be based on an ensemble of multiple machine learning algorithms, which may or may not be based on a common algorithm (e.g., neural network) or a common type of machine learning algorithm (e.g., supervised).

The security feature presence validator 338 validates the presence of one or more security features associated with the document. Examples of security features include, but are not limited to, color shifting ink, watermark, seals, holograms, security strips, UV ink, signatures, chips, machine readable zones, etc.

In some implementations, the security feature presence validator 338 is communicatively coupled to the auto-classifier 334 to receive a document classification. In some implementations, the security feature presence validator 338 receives a document class from the auto-classifier 334 and determines a set of security features associated with the determined document class. For example, the security feature presence validator 338 receives a class of government issued ID that includes a hologram (i.e., a security feature), and determines whether the hologram is present in the image data.

In some implementations, the security feature presence validator 338 is communicatively coupled to the coordinate determiner 322 to receive the set of coordinates. In some implementations, the security feature presence validator 338 determines whether a security feature is present based on the set of coordinates determined by the coordinate determiner 322. For example, based on the class of document, the security feature presence validator 338 knows what security features should be present on the document, and where on the document, those features are expected, and, based on the set of coordinates representing the document's corners in the image data, the security feature presence validator may determine what portion(s) of the image data to analyze to determine presence (or absence) of a security feature.

Depending on the implementation and use case, the security feature presence validator 338 may analyze one or more images of the document (pre or post auto-capture depending on the implementation) to determine whether a security feature is present. For example, for security features such as color shifting ink and holograms, the security feature presence validator 338 may analyze multiple frames in order to detect the color shift or presence of a hologram (e.g., by determining a change in a hue, or other image attribute, distribution of that area from one image to the next).

In some implementations, the security feature presence validator 338 trains a security feature presence model to validate security feature presence. The varieties of supervised, semi-supervised, and unsupervised machine learning algorithms that may be used, by the security feature presence validator 338, to train the security feature presence model are so numerous as to defy a complete list. Example algorithms include, but are not limited to, a decision tree; a gradient boosted tree; boosted stumps; a random forest; a support vector machine; a neural network; a convolutional neural network; a recurrent neural network; long short-term memory; transformer; logistic regression (with regularization), linear regression (with regularization); stacking; a Markov model; Markov chain; support vector machines; and others. Additionally, the security feature presence model, in some implementations, may be based on an ensemble of multiple machine learning algorithms, which may or may not be based on a common algorithm (e.g., neural network) or a common type of machine learning algorithm (e.g., supervised).

The document data extractor 340 may extract data from image data. In some implementations, the document data extractor 340 extracts one or more of human-readable data and machine-readable data. For example, the document data extractor 340 extracts human-readable data by applying optical character recognition to the (auto-captured) image data, e.g., to perform driver's license class extraction and OCR on the backside of EU driver's licenses. In another example, the document data extractor 340 extracts human readable data by reading a barcode, QR code, or other machine-readable data in the (auto-captured) image data.

In some implementations, the document data extractor 340 is communicatively coupled to other verification components (not shown), which may validate the data extracted from the document. For example, the document data extractor 340 may be communicatively coupled to a facial recognition component (not shown) to compare the face in the received image of an identification document, to the face in the image on a driver's license database, or to look up and compare the information extracted from the document to another source (e.g., compare a name and account number in the received image to those in a customer record). In some implementations, the system 100 may take an action based on whether a validation is successful. Examples of actions, include, but are not limited to, permitting a transaction, login, verification, or request; rejecting a transaction, login, verification, or request; escalating (e.g., requesting additional verification or authentication steps or referring for human review or intervention), etc.

The document liveness detector 342 determines whether the document is live. In some implementations, the document liveness detector 342 determines whether a document is live, at least in part, by determining whether a linkage is present between images of the front of the document and the back of the document. For example, the document liveness detector 342 trains and applies a recurrent neural network to determine whether the auto captured image data represents the documentation being flipped over. In some implementations, the document liveness detector 342 determines whether a document is live, at least in part, by determining whether the image data is consistent with the live feedback (e.g., determines if the user rotates the camera clockwise after receiving feedback to do so).

In some implementations, the document liveness detector 342 trains a document liveness determination model. The varieties of supervised, semi-supervised, and unsupervised machine learning algorithms that may be used, by the document liveness detector 342, to train a document liveness determination model are so numerous as to defy a complete list. Example algorithms include, but are not limited to, a decision tree; a gradient boosted tree; boosted stumps; a random forest; a support vector machine; a neural network; a convolutional neural network; a recurrent neural network; long short-term memory; transformer; logistic regression (with regularization), linear regression (with regularization); stacking; a Markov model; Markov chain; support vector machines; and others. Additionally, the document liveness determination model, in some implementations, may be based on an ensemble of multiple machine learning algorithms, which may or may not be based on a common algorithm (e.g., neural network) or a common type of machine learning algorithm (e.g., supervised).

Example Methods

Figure 5:
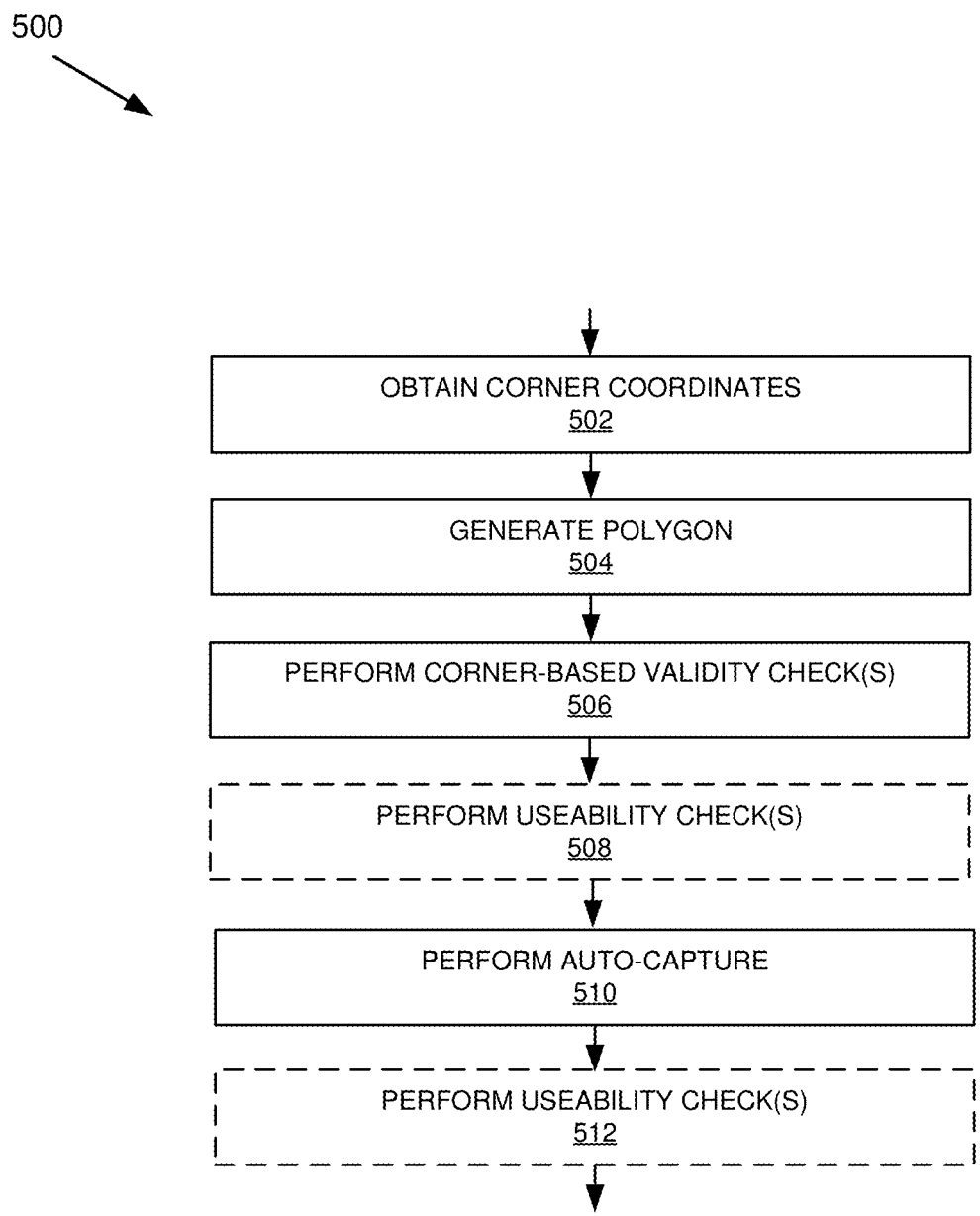
FIG. 5 is a flowchart of an example method for automatically detecting and capturing a document in accordance with some implementations.
Figure 6:
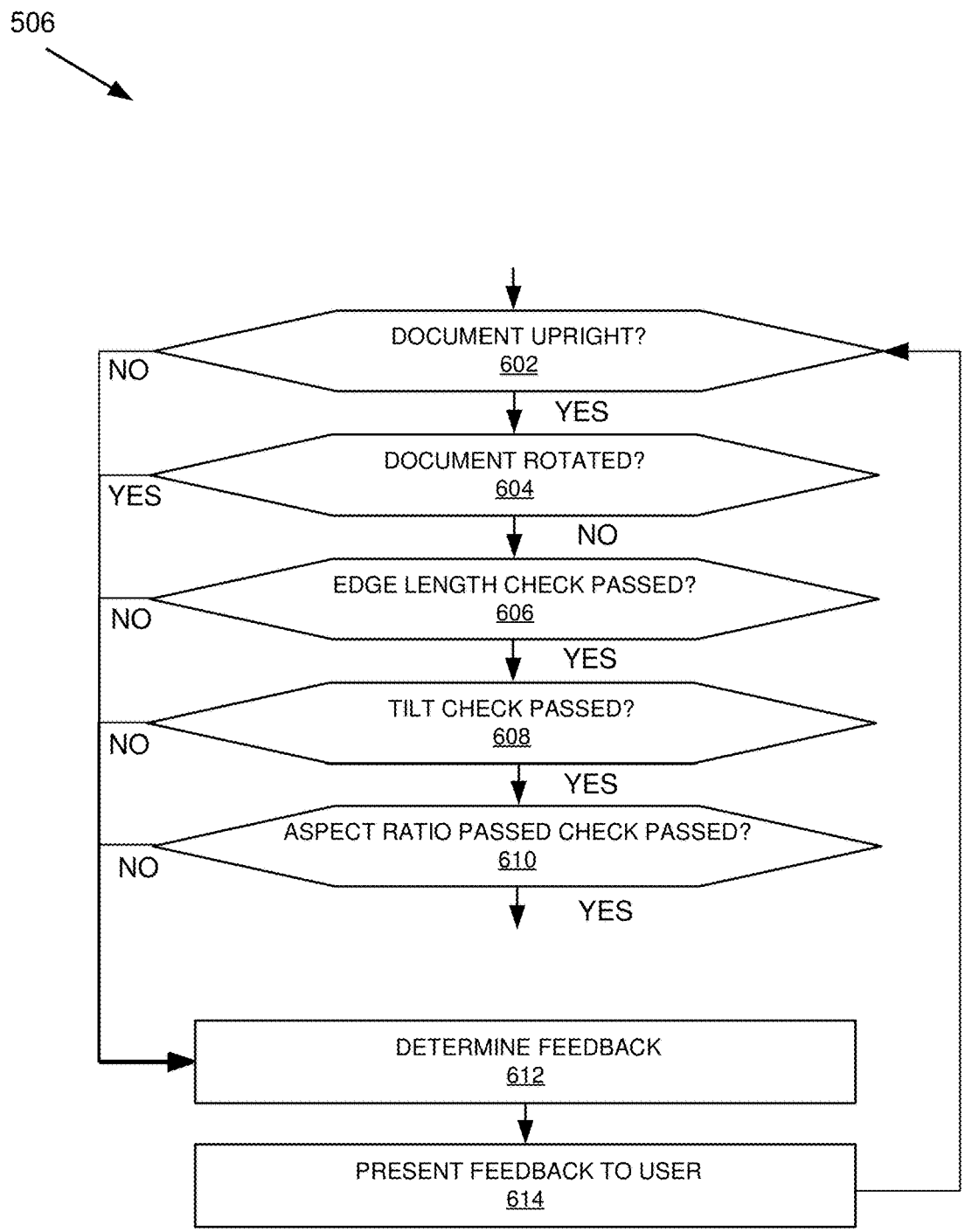
FIG. 6 is a flowchart of an example method for performing one or more validity checks in accordance with some implementations.

FIGS. 5 and 6 are flowcharts of example methods that may, in accordance with some implementations, be performed by the systems described above with reference to FIGS. 1-3. The methods 500 and 506 of FIGS. 5 and 6, respectively, are provided for illustrative purposes, and many variations exist and are within the scope of the disclosure herein.

FIG. 5 is a flowchart of an example method 500 for automatically detecting and capturing a document in accordance with some implementations. At block 502, the coordinate determiner 322 obtains (e.g., determines) corner coordinates. At block 504, the polygon generator 324 generates a polygon. At block 506, the corner validity checker 326 performs one or more corner-based validity checks. At block 508, the usability checker 328 may, depending on the implementation, optionally perform one or more usability checks prior to auto-capture. At block 510, the auto-capturer 332 performs an auto-capture. At block 512, usability checker 328 may, depending on the implementation, optionally perform one or more usability checks prior to auto-capture post auto-capture. Depending on the implementation, the one or more usability checks performed at blocks 508 and 512 may be mutually exclusive. Also, depending on the implementation one or more of block 508 and 512 may be omitted.

FIG. 6 is a flowchart of an example method 506 for performing a set of corner-based validity checks in accordance with some implementations. At block 602, the corner validity checker 326 determines whether the document is upright based on the corner coordinates. When the corner validity checker 326 determines the document is upright based on the corner coordinates (602—YES), the method 506 continues at block 604. When the corner validity checker 326 determines the document is not upright based on the corner coordinates (602—NO), the method 506 continues at block 612. At block 612, the live feedback generator 330 determines feedback (e.g., "Document is upside down. Please rotate the document 180 degrees."), which is presented to the user at block 614.

At block 604, the corner validity checker 326 determines whether the document is rotated based on the corner coordinates. When the corner validity checker 326 determines the document is not rotated based on the corner coordinates (604—NO), the method 506 continues at block 606. When the corner validity checker 326 determines the document is rotated based on the corner coordinates (602—YES), the method 506 continues at block 612. At block 612, the live feedback generator 330 determines feedback (e.g., "Rotate the document clockwise," or counterclockwise depending on the use case), which is presented to the user at block 614.

At block 606, the corner validity checker 326 determines whether an edge length check, based on the corner coordinates, is passed. When the corner validity checker 326 determines the edge length check is passed (606—YES), the method 506 continues at block 608. When the corner validity checker 326 determines that the edge length check fails (606—NO), the method 506 continues at block 612. At block 612, the live feedback generator 330 determines feedback, which is presented to the user at block 614.

At block 608, the corner validity checker 326 determines whether a tilt test is passed based on the corner coordinates. When the corner validity checker 326 determines the tilt test is passed (608—YES), the method 506 continues at block 610. When the corner validity checker 326 determines the tilt test fails (608—NO), the method 506 continues at block 612. At block 612, the live feedback generator 330 determines feedback, which is presented to the user at block 614.

At block 610, the corner validity checker 326 determines whether an aspect ratio check is passed based on the corner coordinates. When the corner validity checker 326 determines the aspect ratio test is passed (610—YES), the method 506 may end. In some implementations the method 506 ends, but method 500 continues, e.g., at block 508, as illustrated in FIG. 5. When the corner validity checker 326 determines the aspect ratio test fails (610—NO), the method 506 continues at block 612. At block 612, the live feedback generator 330 determines feedback, which is presented to the user at block 614.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer-readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   receiving, using one or more processors, first image data representing a first image of a document;
   obtaining, using the one or more processors, a first set of document corner coordinates representing corners of the document in the first image, the first set of document corner coordinates determined at least in part by a neural network document corner coordinate determination model performing a regression on the first image;
   receiving, using the one or more processors, second image data representing a second image of the document;
   obtaining, using the one or more processors, a second set of document corner coordinates representing the corners of the document in the second image, the second set of document corner coordinates determined at least in part by the neural network document corner coordinate determination model performing the regression on the second image;
   determining an inter-image corner distance value based on the first set of document corner coordinates and the second set of document corner coordinates;
   determining that the inter-image corner distance value satisfies a first threshold;
   performing, using the one or more processors, an auto-capture based on satisfaction of the first threshold; and
   performing, using the one or more processors, a plurality of useability checks in an order associated with ascending resource intensity, wherein a least resource intensive useability test from the plurality of useability checks is performed first.

2. The method of claim 1 further including:
   training the neural network document corner coordinate determination model on a first set of training image data, the first set of training image data including images of documents and non-documents;
   obtaining a second set of training data, the second set of training data including labeled images of documents; and
   retraining the neural network document corner coordinate determination model on the second set of training data.

3. The method of claim 2, wherein the second set of training data comprises a set of training images having a normalized format and a set of labels, the set of labels including a document type label describing a type of document in an associated image and a set of corner labels representing locations of corners of the document in the associated image.

4. The method of claim 1, further including:
   determining a class associated with the document;
   generating a first polygon based on the first set of document corner coordinates; and
   performing one or more corner-based validity checks based on the first set of document corner coordinates and the class associated with the document, wherein the one or more corner-based validity checks include at least one of whether the document is upright, whether the document is rotated, whether an edge length check is passed, whether the document is tilted, and an aspect ratio check.

5. The method of claim 1, wherein the plurality of useability checks includes least one of a glare detection, a blur detection, an obstruction detection, a damage detection, and a color detection.

6. The method of claim 1 further including:
generating a first polygon based on the first set of document corner coordinates; and
determining, based on the first polygon, whether a corner of the document is absent from the first image of the document, wherein at least a portion of the one or more useability checks is performed responsive to determining that no corner of the document is absent from the first image of document.

7. The method of claim 1 further including:
generating a first polygon based on the first set of document corner coordinates;
performing one or more corner-based validity checks based on the first set of document corner coordinates;
determining that the first image of the document is valid based on the first polygon and one or more corner-based validity checks based on the first set of document corner coordinates;
determining that a second image of the document is valid based on a second polygon and one or more corner-based validity checks based on the second set of document corner coordinates representing the corners of the document in the second image;
incrementing a counter representing a number of valid results based on the validity based on the first polygon and the one or more corner-based validity checks based on the first set of document corner coordinates, the validity based on the second polygon and the one or more corner-based validity checks based on the second set of document corner coordinates, and the satisfaction of the first threshold;
determining whether the counter satisfies a second threshold; and
wherein the auto-capture is further based on, and responsive to, the counter satisfying the second threshold.

8. The method of claim 1, wherein the first image of the document and the second image of the document are non-consecutive images.

9. The method of claim 7, wherein the counter is reset when one or more of the inter-image corner distance value does not satisfy the first threshold or, prior to the counter satisfying the second threshold, a third image of the document is determined to be invalid based on a third polygon and one or more corner-based validity checks based on a third set of corner coordinates representing the corners of the document in the third image.

10. The method of claim 1, wherein a plurality of useability checks are performed prior to the performance of the auto-capture.

11. The method of claim 1 further comprising:
determining whether captured image data representing the document is consistent with a live document based on one or more of:
whether received image data is consistent with live feedback provided to a user, and
a linkage between images associated with a front and a back of a document.

12. A system comprising:
one or more processor; and
a memory, the memory storing instructions that, when executed by the processor, cause the system to:
receive first image data representing a first image of a document;
obtain a first set of document corner coordinates representing corners of the document in the first image, the first set of document corner coordinates determined at least in part by a neural network document coordinate determination model performing a regression on the first image;
receive, second image data representing a second image of the document;
obtain a second set of document corner coordinates representing the corners of the document in the second image, the second set of document corner coordinates determined at least in part by the neural network document coordinate determination model performing the regression on the second image;
determine an inter-image corner distance value based on the first set of document corner coordinates and the second set of document corner coordinates;
determine that the inter-image corner distance value satisfies a first threshold;
perform an auto-capture based on satisfaction of the first threshold; and
perform a plurality of useability checks in an order associated with ascending resource intensity, wherein a least resource intensive useability test from the plurality of useability checks is performed first.

13. The system of claim 12, wherein the instructions further cause the one or more processors to:
train the neural network document corner coordinate determination model on a first set of training image data, the first set of training image data including images of documents and non-documents;
obtain a second set of training data, the second set of training data including labeled images of documents; and
retrain the neural network document corner coordinate determination model on the second set of training data.

14. The system of claim 13, wherein the second set of training data comprises a set of training images having a normalized format and a set of labels, the set of labels including a document type label describing a type of document in an associated image and a set of corner labels representing locations of corners of the document in the associated image.

15. The system of claim 12, wherein the instructions further cause the one or more processors to:
determine a class associated with the document;
generate a first polygon based on the first set of document corner coordinates; and
perform one or more corner-based validity checks based on the first set of document corner coordinates and the class determined to be associated with the document, wherein the one or more corner-based validity checks include at least one of whether the document is upright, whether the document is rotated, whether an edge length check is passed, whether the document is tilted, and an aspect ratio check.

16. The system of claim 12, wherein the plurality of useability checks includes at least one of a glare detection, a blur detection, an obstruction detection, a damage detection, and a color detection.

17. The system of claim 12, wherein the instructions further cause the one or more processors to:
generate a first polygon based on the first set of document corner coordinates; and
determine, based on the first polygon, whether a corner of the document is absent from the first image of the document, wherein at least a portion of the one or more useability checks is performed responsive to determining that no corner of the document is absent from the first image of document.

18. The system of claim 12, wherein the instructions further cause the one or more processors to:
generate a first polygon based on the first set of document corner coordinates;
perform one or more corner-based validity checks based on the first set of document corner coordinates;
determine that the first image of the document is valid based on the first polygon and one or more corner-based validity checks based on the first set of document corner
determine that a second image of the document is valid based on a second polygon and one or more corner-based validity checks based on a second set of document corner coordinates representing the corners of the document in the second image;
increment a counter representing a number of valid results based on the validity based on the first polygon and the one or more corner-based validity checks based on the first set of document corner coordinates, the validity based on the second polygon and the one or more corner-based validity checks based on the second set of document corner coordinates, and the satisfaction of the first threshold;
determine whether the counter satisfies a second threshold; and
wherein the auto-capture is performed based on, and responsive to, the counter satisfying the second threshold.

19. The system of claim 12, wherein the first image of the document and the second image of the document are non-consecutive images.

20. The system of claim 18, wherein the counter is reset when one or more of the inter-image corner distance value does not satisfy the first threshold or, prior to the counter satisfying the second threshold, a third image of the document is determined to be invalid based on a third polygon and one or more corner-based validity checks based on a third set of corner coordinates representing the corners of the document in the third image.

* * * * *